United States Patent Office.

CARL V. PETRAEUS, OF CAMDEN, NEW JERSEY.

PROCESS OF MAKING ACID POTASSIUM PHOSPHATES.

SPECIFICATION forming part of Letters Patent No. 374,201, dated December 6, 1887.

Application filed January 25, 1887. Serial No. 225,426. (No specimens.)

*To all whom it may concern:*

Be it known that I, CARL V. PETRAEUS, of the city and county of Camden, in the State of New Jersey, have invented a new and useful Process for Manufacturing Acid Phosphates of Potash in a pure Crystallized Condition, of which the following is a true and exact description.

The phosphate of potash manufactured according to my process corresponds very closely to the formula $PO_4K_{1.1}H_{1.9}$, containing potassium slightly in excess of the potassium phosphate $PO_4KH_2$ described in books. The raw material I employ is either bone, bone-black, South Carolina rock, or any compounds mainly composed of phosphate of lime.

My process differs somewhat with the raw material employed. If bone or phosphate material containing organic material be used, it should be roasted before bringing the phosphoric acid into solution. The raw material, freed of all organic matter, is reduced to a finely-powdered condition, and is then treated with an acid which will produce a soluble phosphate. Oxalic acid may be employed, and has certain advantages; but, for economical reasons, I prefer to employ sulphuric acid. If material such as South Carolina phosphates be the raw material to be acted on, I prefer to mix this with acid of about 50° Baumé; but if bone-ash or bone-black be the material, then I prefer to use acid of from 25° to 35° Baumé.

In practice I mix one hundred pounds finely-ground bone-ash with about one hundred and ten pounds of acid of 50° Baumé, which, before mixing with the bone-ash, is reduced to 25° to 35° Baumé. After allowing the acid to act on the bone-ash for from twenty-four to forty-eight hours, I leach the mass with water, and thus produce a solution consisting mainly of acid phosphate of lime and phosphoric acid, but also containing small quantities of acid phosphates of magnesia, phosphate of iron, &c., and sulphate of lime.

In place of the leaching with water, as heretofore described, a solution of potassum sulphate may be used in order to decompose the acid phosphate of lime. I prefer, however, to employ water, and make this decomposition a second step in the process. In the solution thus obtained I determine the amount of lime in combination with phosphoric acid, and I add sulphate of potassium in sufficient quantities to decompose the entire amount of phosphate of lime into sulphate of lime and acid phosphate of potash. This is then filtered, and the solution obtained contains acid phosphate of potash with a slight amount of phosphates of magnesia, alumina, and iron, together with a slight amount of sulphate of lime and free phosphoric acid. This solution I then further purify by adding carbonate of potash or caustic potash in sufficient quantities to combine with the free phosphoric acid to form phosphate of potash with about ten per cent. more potash than required for the formula $PO_4KH_2$. The solution is then gently heated, whereby all the lime, magnesia, alumina, and iron separate out as phosphates. This is filtered, and the clear solution is evaporated to crystallization and cooled. The mother-liquor is then drained from the crystals, which, after drying and grinding, are suitable as a substitute for bitartrate of potash in the manufacture of baking-powder.

Instead of using carbonate of potash to neutralize the free phosphoric acid, the greater part may be neutralized by sulphate of potash and slaked lime; but the excess of the free acid must be neutralized by carbonate or caustic potash in order to free the solution from all lime, magnesia, iron, and alumina.

I have described the operation of my process when bone-ash is used. With any other phosphatic material being mainly phosphate of lime the operation is similar.

Having now described my invention, what I claim as new, and desire to protect by Letters Patent, is—

The process of manufacturing a pure crystallized acid phosphate of potash, which consists in decomposing bone or similar phosphate with a suitable acid—such as sulphuric or oxalic acid—and leaching, so as to produce an impure acid phosphate of lime, then decomposing the acid phosphate of lime by sulphate of potash, and then adding carbonate of potash or caustic potash in excess—that is, in quantities sufficient to form in the solution an acid phosphate of potash containing an excess of potash over that in the dihydrogen potassium phosphate—and, after filtration, evaporating the solution to the point of crystallization, thus obtaining a crystallized acid phosphate of potash, substantially as described.

CARL V. PETRAEUS.

Witnesses:
RICHARD S. CHILD, Jr.,
BUTLER KENNER HARDING.